(12) United States Patent
Cho

(10) Patent No.: US 8,152,311 B2
(45) Date of Patent: Apr. 10, 2012

(54) DISPLAY APPARATUS AND LIGHT CONTROL METHOD OF THE SAME

(75) Inventor: Bong-hwan Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 576 days.

(21) Appl. No.: 12/272,187

(22) Filed: Nov. 17, 2008

(65) Prior Publication Data

US 2009/0251056 A1    Oct. 8, 2009

(30) Foreign Application Priority Data

Apr. 3, 2008    (KR) .................. 10-2008-0031221

(51) Int. Cl.
*G03B 21/20*    (2006.01)

(52) U.S. Cl. ................ 353/85; 353/20; 353/29; 353/31; 353/33; 353/52; 353/98; 353/99; 353/69; 353/70; 353/101; 353/119; 353/122; 362/276; 362/295; 362/394; 362/231

(58) Field of Classification Search .................... 353/20, 353/29, 31, 33, 52, 85, 98, 119, 122, 99, 353/69, 70, 101; 315/309, 297, 294, 291, 315/307, 312; 348/748, 751, 756, 744, 750, 348/771, 761; 362/257, 259, 264, 276, 295, 362/394, 231; 345/32, 207, 7, 3.4; 250/205
See application file for complete search history.

(56) References Cited

U.S. PATENT DOCUMENTS

| | | | | |
|---|---|---|---|---|
| 6,460,999 B1 * | 10/2002 | Suzuki | | 353/79 |
| 6,683,657 B1 * | 1/2004 | Miyawaki | | 348/743 |
| 6,953,251 B2 * | 10/2005 | Seki et al. | | 353/85 |
| 7,136,035 B2 * | 11/2006 | Yoshida | | 345/87 |
| 7,378,631 B2 * | 5/2008 | Hong | | 250/205 |
| 7,578,595 B2 * | 8/2009 | Miwa et al. | | 353/54 |
| 7,795,822 B2 * | 9/2010 | Arai et al. | | 315/309 |
| 2001/0013924 A1 * | 8/2001 | Yokoyama et al. | | 353/52 |
| 2004/0239880 A1 * | 12/2004 | Kapellner et al. | | 353/20 |
| 2005/0122481 A1 * | 6/2005 | Yamasaki et al. | | 353/31 |
| 2006/0002109 A1 * | 1/2006 | Imade | | 362/231 |
| 2006/0238723 A1 | 10/2006 | El-Ghoroury | | |
| 2006/0279709 A1 * | 12/2006 | Yamamoto | | 353/85 |
| 2007/0035538 A1 * | 2/2007 | Garcia et al. | | 345/212 |
| 2009/0121154 A1 * | 5/2009 | Westphal et al. | | 250/484.4 |
| 2009/0128451 A1 | 5/2009 | Tokui | | |

FOREIGN PATENT DOCUMENTS

| | | |
|---|---|---|
| JP | 2005-123841 A | 5/2005 |
| JP | 2007-108383 A | 4/2007 |
| JP | 2007-127781 A | 5/2007 |
| JP | 2007-298798 A | 11/2007 |
| WO | 2007/023681 A1 | 3/2007 |

* cited by examiner

*Primary Examiner* — Georgia Y Epps
*Assistant Examiner* — Sultan Chowdhury
(74) *Attorney, Agent, or Firm* — Sughrue Mion, PLLC

(57) ABSTRACT

Disclosed are a display apparatus and a light control method thereof, in which the display apparatus including a display panel, a light source unit, an illumination unit to illuminate the display panel with light emitted from the light source unit, and a projection unit to project the light from the display panel in a predetermined direction includes: a light sensor which is provided between the light source unit and the illumination unit; and a light controller which corrects brightness of light sensed by the light sensor on the basis of reflective characteristics of the display panel. With this configuration, the quantity of light is prevented from decreasing so as to prevent the brightness of an image from decreasing.

31 Claims, 9 Drawing Sheets

DISPLAY APPARATUS AND LIGHT CONTROL METHOD OF THE SAME

CROSS-REFERENCE TO RELATED APPLICATION

This application claims priority from Korean Patent Application No. 10-2008-0031221, filed on Apr. 3, 2008 in the Korean Intellectual Property Office, the disclosure of which is incorporated herein by reference.

BACKGROUND OF INVENTION

1. Field of Invention

Apparatuses and methods consistent with the present invention relate to a display apparatus and a light control method of the same, and more particularly to a display apparatus having an optical system to enlarge and project light and a light control method of the same.

2. Description of the Related Art

Among display apparatuses, a projection system enlarges and projects an image formed by a display device to a screen, thereby providing a large-sized image. The projection system includes a light source unit to emit light, an illumination assembly to condense the light emitted from the light source unit, a display device to form an image with the light received from the illumination assembly, and a projecting lens assembly to project the light corresponding to the image formed by the display device to the screen.

Meanwhile, the display apparatus senses light emitted from the light source unit so as to control a white balance or a color temperature of the light to be projected to the display device. For the sensing of the light, a light sensor may be provided between the light source unit and the illumination assembly in order to sense light from the light source unit, or may be provided between the display device and the projecting lens assembly in order to sense light projected from the display device to the projecting lens assembly. As the projection system has recently become thinner, the light sensor is generally provided rather between the light source unit and the illumination assembly than between the display device and the projecting lens assembly. However, in this case, the light emitted from the light source unit to the pixel elements of the display device via the illumination assembly is reflectively returned to the illumination assembly, so that the brightness of the light cannot be precisely sensed. To solve this problem, a black signal may be added to video data, so that the light can be prevented from being reflected from the pixel elements of the display device, but the brightness of the video is lowered since the quantity of light decreases.

SUMMARY OF THE INVENTION

Accordingly, it is an aspect of the present invention to provide a display apparatus and a light control method of the same, in which the quantity of light is prevented from decreasing to thereby prevent the brightness of an image from decreasing.

Another aspect of the present invention is to provide a display apparatus and a light control method of the same, in which the brightness of light is precisely sensed.

The foregoing and/or other aspects of the present invention can be achieved by providing a display apparatus including a display panel, a light source unit, an illumination unit to illuminate the display panel with light emitted from the light source unit, and a projection unit to project the light from the display panel in a predetermined direction, the display apparatus including: a light sensor which is provided between the light source unit and the illumination unit; and a light controller which corrects brightness of light sensed by the light sensor on the basis of reflective characteristics of the display panel.

The light controller may exclude the brightness of the light reflected from the display panel to the illumination unit from the brightness of the sensed light.

The display panel may include a digital micro-mirror device (DMD) having a plurality of pixels, and the light controller may include a storage that stores the brightness of the light reflected from the display panel to the illumination unit in correspondence to the number of pixels to be turned on.

The display panel may include a digital micro-mirror device (DMD) having a plurality of pixels, and the light controller may calculate the brightness of the light reflected from the display panel to the illumination unit in correspondence to the number of pixels to be turned on, through a predetermined function.

The light source unit may include a plurality of light sources that emit light having different colors, and the display apparatus may further include a light source driver to supply driving power to the light source unit to emit light having different colors in sequence according to predetermined periods.

The light sensor may output a sensed voltage corresponding to the sensed light, and the light controller may include an operation amplifier to which the sensed voltage and a reference voltage of which level is adjusted by a pulse width modulation (PWM) signal corresponding to the driving power are input, and determine a duty ratio of the PWM signal corresponding to the sensed voltage on the basis of an output signal from the operation amplifier.

The light sensor may include a signal converter to convert the brightness of the sensed light into a digital signal.

The light controller may adjust at least one of a white balance and a color temperature of the light to be offered to the display panel on the basis of the correct brightness of the light.

Another aspect of the present invention is to provide a display apparatus including a display panel, a light source unit, an illumination unit to illuminate the display panel with light emitted from the light source unit, and a projection unit to project the light from the display panel in a predetermined direction, the display apparatus including: a light sensor which is provided between the light source unit and the illumination unit; and a light controller which determines brightness of light emitted from the illumination unit to the display panel on the basis of brightness of light sensed by the light sensor and the brightness of light reflected from the display panel to the illumination unit, and adjusts at least one of a white balance and a color temperature of the light on the basis of the determined brightness of the light.

A third aspect of the present invention is to provide a method of control a display apparatus including a display panel, a light source unit, an illumination unit to illuminate the display panel with light emitted from the light source unit, and a projection unit to project the light from the display panel in a predetermined direction, the method including: providing the display panel with the light; sensing the light through the light sensor; and correcting the brightness of the sensed light on the basis of reflective characteristics of the display panel.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF EXEMPLARY EMBODIMENTS OF THE INVENTION

Figure 1:
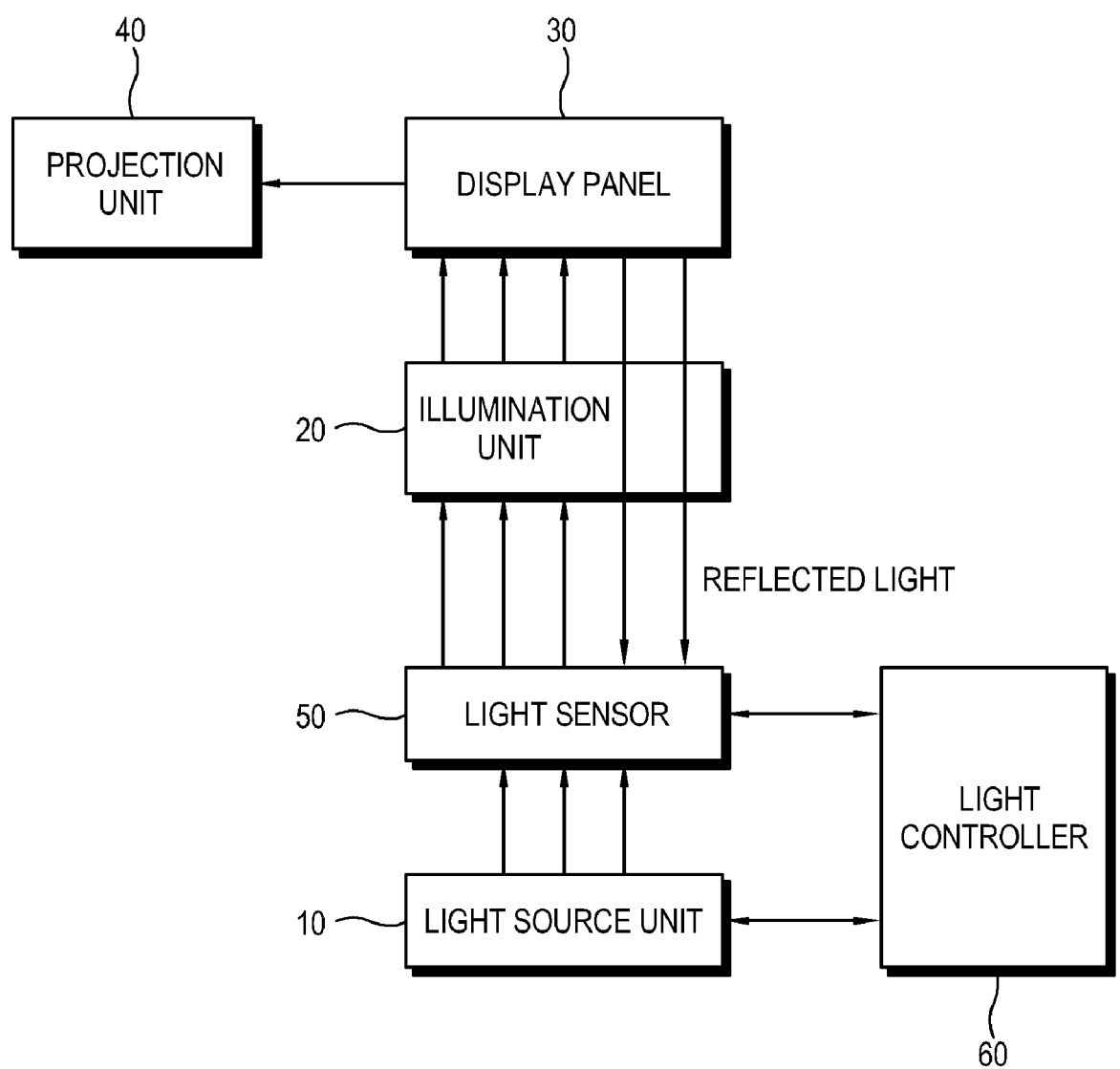
FIG. 1 is a control block diagram of a display apparatus according to a first exemplary embodiment of the present invention.

Below, embodiments of the present invention will be described in detail with reference to accompanying drawings so as to be easily realized by a person having ordinary knowledge in the art. The present invention may be embodied in various forms without being limited to the embodiments set forth herein. Descriptions of well-known parts are omitted for clarity, and like reference numerals refer to like elements throughout.

FIG. 1 is a control block diagram of a display apparatus according to a first exemplary embodiment of the present invention.

As shown therein, the display apparatus includes a light source unit 10, an illumination unit 20, a display panel 30, a projection unit 40, a light sensor 50, and a light controller 60. In this embodiment, the display apparatus may be achieved by a projection system that enlarges and projects light from the display panel 30 to a region such as a screen where an image is displayed.

The light source unit 10 emits light to the display panel 30. The light source unit 10 may include an arch lamp of emitting white light, a point light source (e.g., a light emitting diode) of emitting trichromatic light, etc. In the case of using the arc lamp, the light source unit 10 includes a ballast for drive, and a color wheel to separate the white light into red, green and blue light. Further, the light source unit 10 may include a plasma display panel (PDP) in which ultraviolet rays generated from discharge gas causes a fluorescent material to emit light.

The illumination unit 20 illuminates the display panel 30 with the light emitted from the light source unit 10. The illumination unit 20 corresponds to an optical system that condenses the light to produce uniform and collimated light. To this end, the illumination unit 20 may include various optical devices such as a condenser lens or a light tunnel. Further, the illumination unit 20 may include diverse mirrors, lenses, etc. to illuminate the display panel 30 with the light via various paths.

The display panel 30 is driven by a panel driver (not shown) and produces an image. In this embodiment, the display panel 30 receives the light from the external light source unit 10 because it cannot emit light by itself. In general, the display panel 30 has used a liquid crystal display (LCD) panel, a liquid crystal on silicon (LCOS) panel, etc. Besides, a digital micro-mirror device (DMD) that includes a plurality of micro-mirrors based on a micro electro mechanical system (MEMS) has been recently developed and used. If the display panel 30 includes a color filter to represent colors, the light source unit 10 may provide white light. Generally, the light source unit 10 illuminates the display panel 30 with the trichromatic light divided temporally and spatially.

The projection unit 40 includes a plurality of lenses for enlarging and projecting the light, and enlarges and projects an image displayed on the display panel 30 in a preset direction.

The display apparatus may include a screen where an image is displayed.

The light sensor 50 is provided between the light source unit 10 and the illumination unit 20 in consideration of a thin thickness of the display apparatus, and senses the light passing through the illumination unit 20. The light sensor 50 may be achieved by a photodiode that outputs an electric signal varied depending on the brightness of light. The photodiode may output a current of which intensity becomes higher or lower as the brightness of received light increases. The light sensed by the light sensor 50 includes the light emitted from the light source unit 10 to the illumination unit 20 and the light reflected from the display panel 30. While the light is projected from the projection unit 40 to the display panel 30 in a certain direction, the light may be reflected toward the illumination unit 20.

The light controller 60 corrects the brightness of light sensed by the light sensor 50 on the basis of optical properties of the display panel 30. To display a proper image, the display apparatus has to control the properties of the light. To this end, the light emitted from the light source unit 10 has to be sensed, but the sensed light includes the light reflected from the display panel 30. Accordingly, the light controller 60 needs correction of excluding the brightness of the light reflected from the display panel 30 from the brightness of the sensed light. The light reflected from the display panel 30 is affected by reflective characteristics of the display panel 30 or an optical path between the display panel 30 and the illumination unit 20. In consideration of these affects, the light controller 60 excludes the effects of the reflected light from the sensed light, thereby obtaining the brightness of the light emitted from the light source unit 10. In the conventional case, the black image was added between the image frames or the black image was added periodically in order to exclude the effects of the light reflected from the display panel. In the case that the black image is added, the light is emitted from the light source unit to the display panel, but there is no light reflected from the display panel toward the projection unit or the illumination unit, thereby excluding the effects of the reflected light. In this conventional case, the black image is periodically displayed, so that the amount of light traveling toward the projection unit is periodically decreased and the brightness of the whole image is decreased. Contrary, according to this embodiment of the present invention, there is no need of adding the black image, so that the amount of light and the brightness of an image do not decrease.

The light controller 60 adjusts at least one of a white balance and a color temperature on the basis of the corrected brightness of the light. The current white balance or color temperature is calculated on the basis of the corrected brightness of the light, and the brightness of red, green and blue light is each adjusted so that the calculated white balance or color temperature can have a preset reference value. A method for adjusting the white balance or the color temperature of the light may be achieved by various known methods, and the scope of the present invention is not limited to a certain method. The light controller 60 outputs information about the adjusted white balance or color temperature of the light to the light source unit 10, thereby controlling the intensity of light emitted from the light source unit 10.

Figure 2:
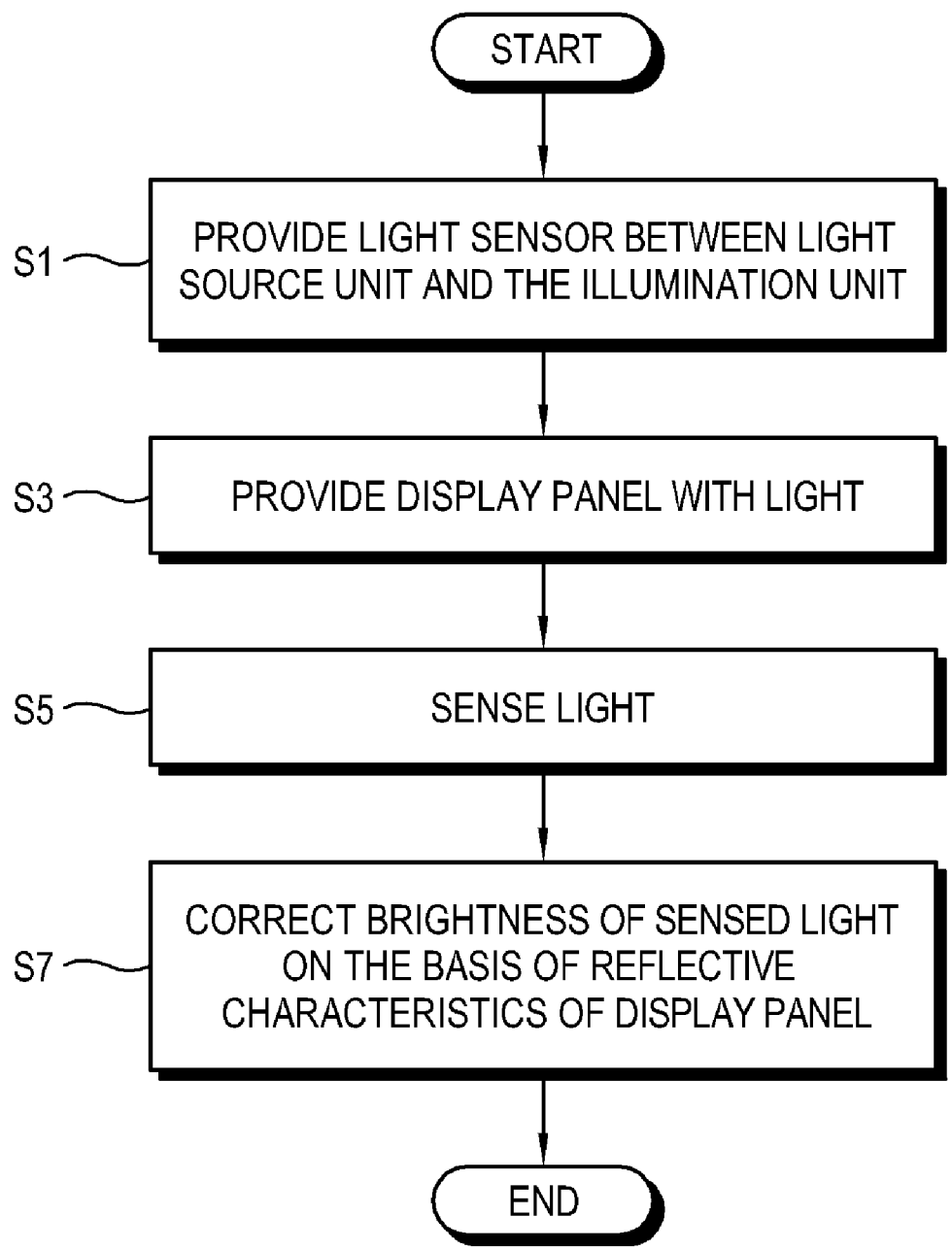
FIG. 2 is a control flowchart for explaining a light control method of the display apparatus of FIG. 1.

FIG. 2 is a control flowchart for explaining a light control method of the display apparatus of FIG. 1. First, a light sensor 50 is provided between the light source unit 10 and the illumination unit 20 (S1). In this embodiment, the light sensor 50 is provided not between the display panel 30 and the projection unit 40 but between the light source unit 10 and the illumination unit 20 in order to make a display apparatus slim and thin. In this case, light is reflected from the display panel 30 to the illumination unit 20. However, the present invention may be applied to systems in which the light sensor 50 is provided between the display panel 3 and the projection unit 40.

The light source unit 10 emits trichromatic light to the display panel 30 in sequence according to a predetermined period (S3), and the light sensor 50 senses the brightness of the light emitted from the light source unit 10 and the light reflected from the display panel 30 (S5).

The light controller 50 corrects the brightness of the light affected by the reflective characteristics of the display panel 30 (S7). That is, the brightness of the light reflected from the display panel 30 is removed from the brightness of the sensed light, so that only the brightness of the light emitted from the light source unit 10 can be determined.

Figure 3:
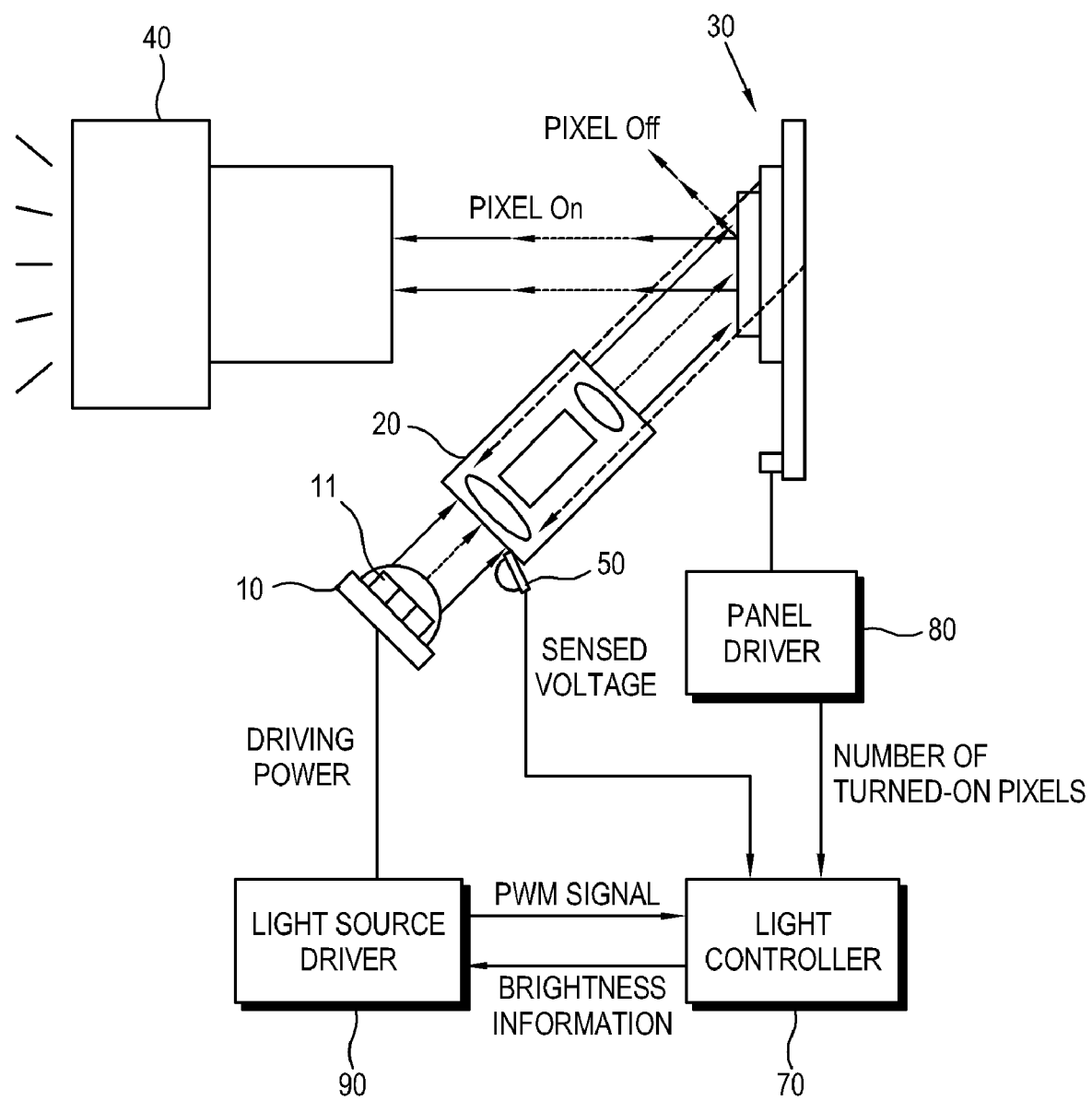
FIG. 3 is a schematic view of a display apparatus according to a second exemplary embodiment of the present invention.

FIG. 3 is a schematic view of a display apparatus according to a second exemplary embodiment of the present invention.

As shown therein, the display apparatus includes a light source unit 10 having point light sources 11, an illumination unit 20 having a light tunnel, a display panel 30, a projection unit 40 having a plurality of lenses, and a light sensor 50 adjacent to the illumination unit 20. Further, the display apparatus includes a panel driver 80 to drive the display panel 30, a light source driver 90 to supply driving power to the light source unit 10, and a light controller 70 to correct the brightness of the sensed light.

The point light source 11 is a light source that emits light having different colors such as red, green and blue. The point light source 11 may include a light emitting diode (LED), a carbon nano tube, a laser diode, etc. The light source unit 10 may include a surface light source that is capable of emitting light having different colors and has a thin sheet shape.

According to an embodiment of the present invention, the display panel 30 includes a digital micro-mirror device (DMD). The DMD includes pixels (refer to FIG. 5) having a plurality of micro-mirrors arranged in two dimension, and drives the micro-mirrors to swing at first and second angles according to a static electric field of a memory device corresponding to each pixel. According to the swing of the micromirror at the first and second angles, a reflecting angle of the light is changed, so that the pixel is turned on or off. As shown in FIG. 3, if the pixel is turned on, the light incident to the display panel 30 travels toward the projection unit 40 while being enlarged. However, if the pixel is turned off, the light travels in other directions than that toward the projection unit 40, so that it becomes a black state where no image is displayed. The DMD has a response time shorter than that of an LCD panel, an LCOS panel or the like display panel, so that a motion picture can be softly and smoothly reproduced.

Figure 4:
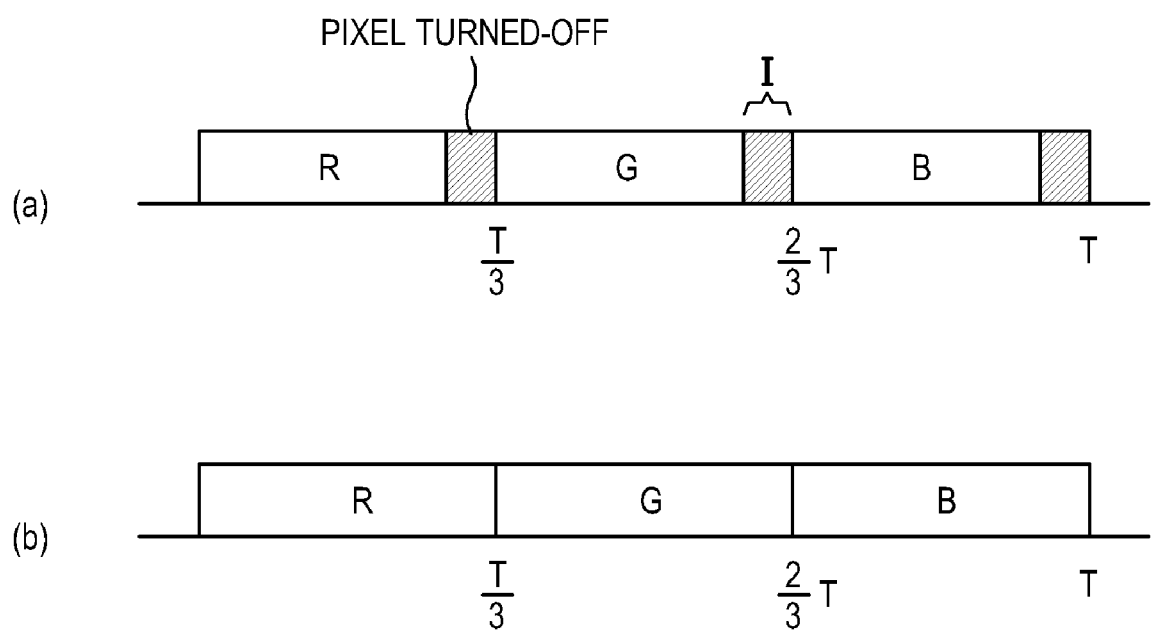
FIG. 4 is a signal waveform diagram showing a turn-on period of a pixel of a display panel of FIG. 3.

The panel driver 80 turns on or off the pixels of the display panel 30 according to a video signal input from the outside. FIG. 4 is a signal waveform diagram showing a turn-on period of a pixel of a display panel of FIG. 3. In a conventional case (a), a pixel corresponding to a red image, a pixel corresponding to a green image, and a pixel corresponding to a blue image were turned on sequentially during a period T for one frame where an image is displayed. However, a black section I where all pixels are turned off was inserted between sections for turning on the pixels. In the black section I, light was emitted from a light source unit to a display unit through an illumination unit, but there was no light reflected from the display unit. Accordingly, the sense of the light was performed in the black section I. The black section I caused the pixels to be turned on for shorter than T/3, so that the light traveling toward a projection unit was decreased, thereby decreasing the brightness of an image. Further, the brightness of the light was sensed only during the black section I, so that there was a limit to sense the brightness of the light in real time and a periodic black image caused an image to flicker On the other hand, in this embodiment (b), a pixel corresponding to a red image, a pixel corresponding to a green image, and a pixel corresponding to a blue image are turned on sequentially during respective periods T/3 obtained by equally dividing the period T for one frame. Consequently, the present invention needs not to add the black section I for sensing the light, thereby preventing loss of the light and the flicker due to the black section I. Further, it is possible to sense the light anytime regardless of the black section I as long as an image is being displayed, thereby facilitating the light control.

The panel driver 80 provides the light controller 70 with information about the number of pixels to be turned on according to a video signal. The number of pixels to be turned on is used while the light controller 70 corrects the brightness of the sensed light (to be described later). Further, the panel driver 80 may output information about the video signal to the light controller 70 so that the light emitted from the light source unit 10 can be controlled corresponding to the video signal. For example, the brightness of the light emitted from the light source unit 10 can be adjusted to become relatively bright or dark corresponding to average brightness of the video signal.

The light source driver 90 supplies the driving power to the light source unit 10 so that red, green and blue light can be emitted in sequence for a predetermined period as described above. The light source driver 90 may include a switching device which controls the driving power to be supplied or not to be supplied to the light source unit 10, and a pulse width modulation (PWM) controller (not shown) which adjusts a level of the driving power by adjusting a pulse width of the switching device. The level of the driving power is changed by a duty ratio of a PWM signal output from the PWM controller, and thus the brightness of the light emitted from the light source unit 10 is adjusted by the changed level of the driving power.

Figure 5A:
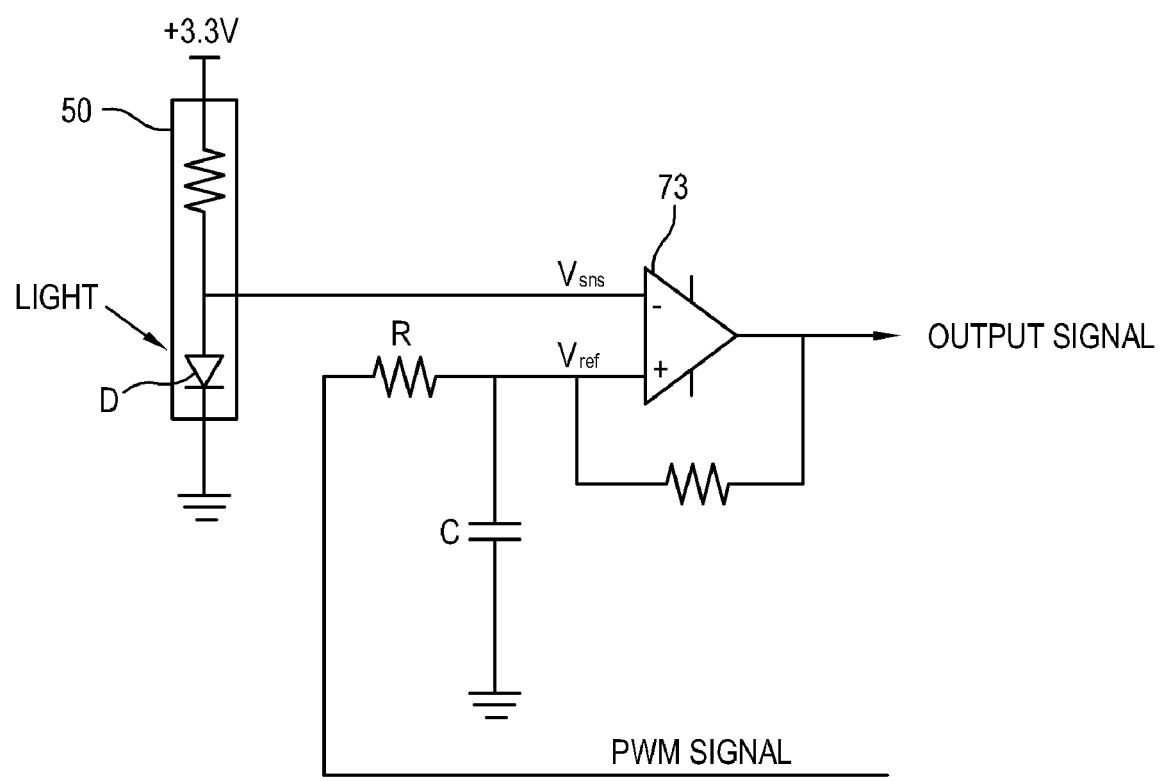
FIG. 5A is a schematic view of a light controller of the display apparatus of FIG. 3.
Figure 5B:
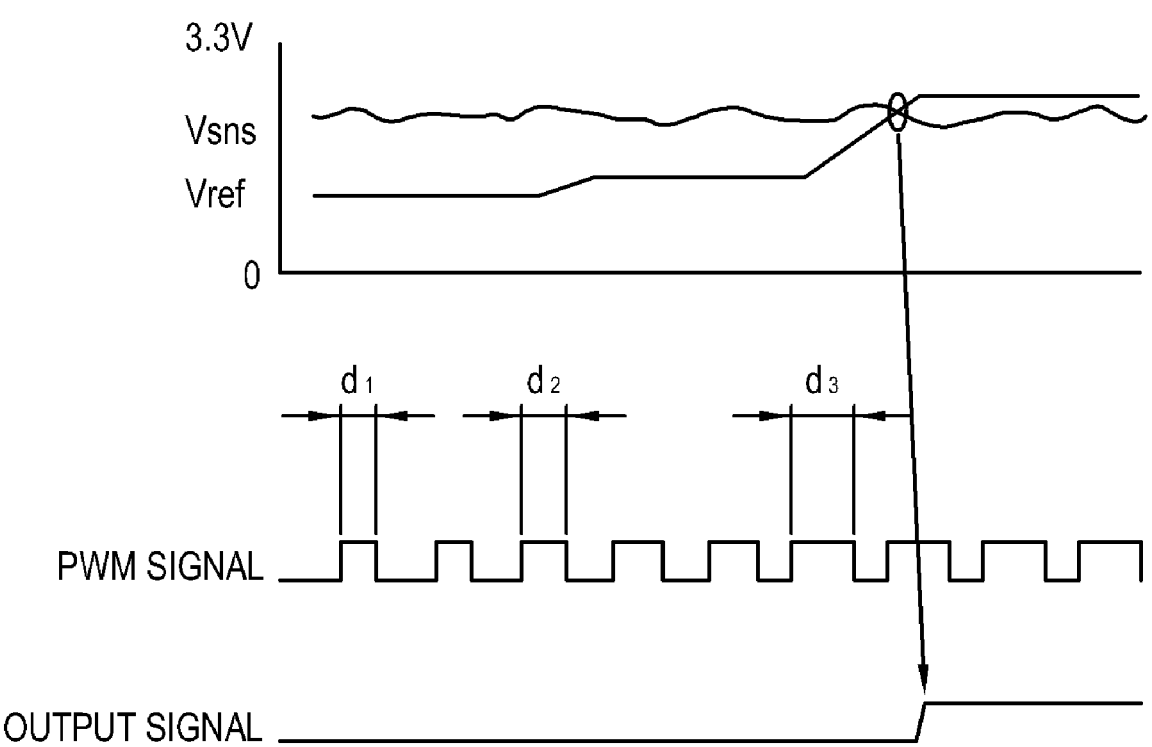
FIG. 5B is a signal waveform diagram explaining a method of measuring the brightness of sensed light in the display apparatus of FIG. 3.

FIG. 5A is a schematic view of a light controller of the display apparatus of FIG. 3, and FIG. 5B is a signal waveform diagram for explaining a method of measuring the brightness of sensed light in the display apparatus of FIG. 3. The light sensor 50 includes a photodiode D to generate an electric current according to the intensity of the sensed light as shown in FIG. 5A. The photodiode D is connected between a ground and a resistor connected to a power source terminal (3.3V) so that it can output a voltage corresponding to the electric current.

The light controller 70 includes an operation amplifier 73 for converting a level of a sensed voltage Vsns generated by the photodiode D into a digital signal. In this embodiment, the operation amplifier 73 includes an inverting terminal (−) to which the sensed voltage Vsns is input, and a non-inverting terminal (+) to which a reference voltage Vref whose level is adjusted by the PWM signal is input. The reference voltage Vref is a voltage obtained by rectifying the PWM signal output from the light source driver 90 through a resistor R and a capacitor C. The level of the reference voltage Vref is changed according to the duty ratio of the PWM signal. As shown in FIG. 5B, if high sections d1, d2 and d3 of the PWM signal increase and thus the duty ratio of the PWM signal increase, the level of the reference voltage Vref increases. In the state that the reference voltage Vref has a lower level than the sensed voltage Vsns, if the reference voltage Vref becomes higher than the sensed voltage Vsns as the duty ratio of the PWM signal increases, an output signal from the operation amplifier 73 increases. This is because the level of the sensed voltage Vsns input to the inverting terminal (−) becomes lower than the level of the reference voltage Vref. The light controller 70 determines the duty ratio of the PWM signal at a time when the level of the output signal is changed, and uses the duty ratio of the PWM signal as the information about the sensed voltage Vsns. If the operation amplifier 73 is used to get the digital signal from the sensed voltage Vsns, the operation amplifier 73 is inexpensive as compared with other devices and does not causes a problem such as the flicker since it needs not to display the black image. The light controller 70 may determine the brightness of the light per frame or every time when a color period of light emitted from the light source unit 10 is changed. Further, the light controller 70 may determine the brightness of the light once per second. That is, the period of sensing the light may be properly selected by a user in consideration of characteristics of the light source unit 10, and freely changeable as long as the white balance or the color temperature of the light can be controlled to maintain its optimum state.

According to another embodiment of the present invention, the duty ratio of the PWM signal may be decreased to obtain the digital signal from the sensed voltage Vsns, and the voltage applied to the inverting terminal (−) and the non-inverting terminal (+) of the operation amplifier 73.

According to another embodiment of the present invention, the light controller 70 may include not an analog device such as the operation amplifier 73 but a digital device. That is, the light controller 70 may include an analog-digital converter (ADC) as a signal converter to convert the brightness of the light into a digital signal. If the light controller 70 includes the ADC, the speed of the ADC sensing the brightness is very faster than that of the operation amplifier 73 and there is a convenience in control since the PWM signal or the like is not used.

Figure 6:
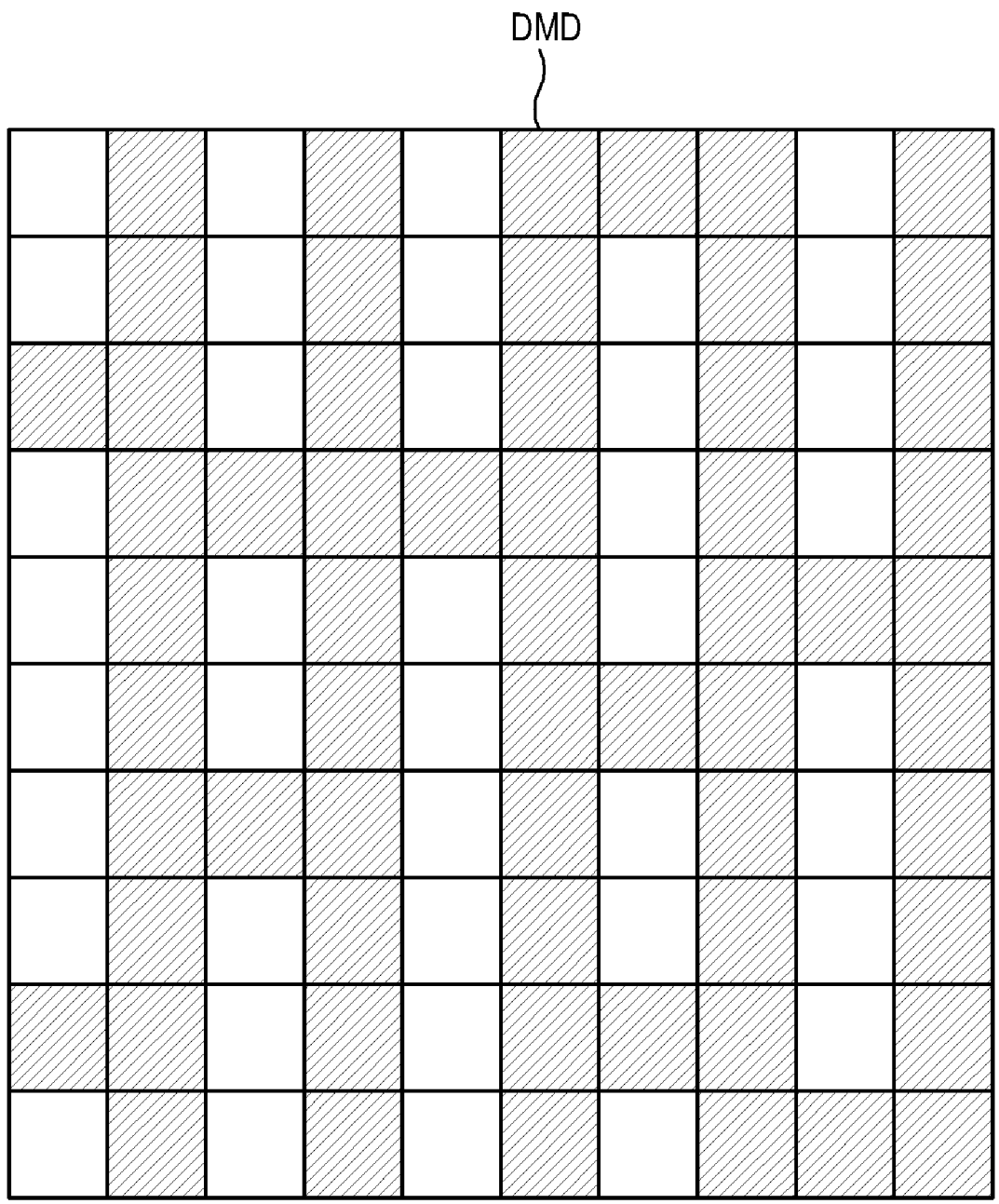
FIG. 6 illustrates a display panel of the display apparatus of FIG. 3.
Figure 7:
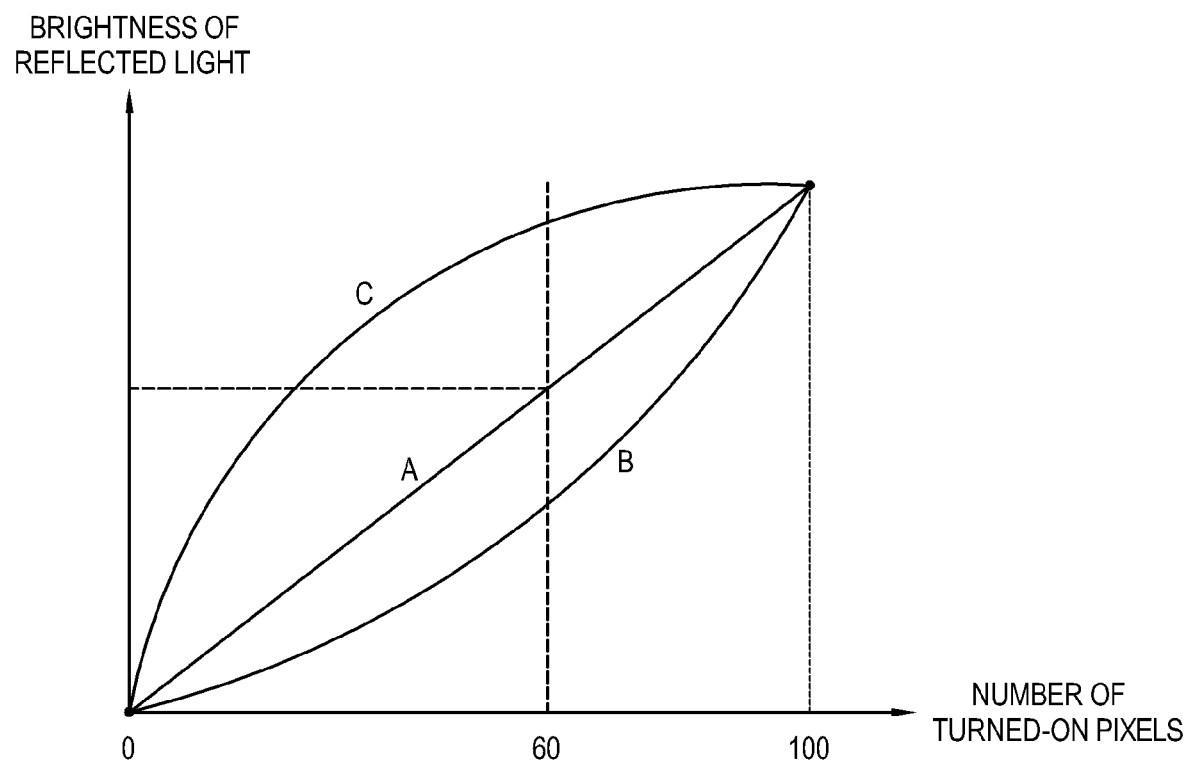
FIG. 7 is a graph of the brightness of reflected light according to the number of turned-on pixels in a display unit of FIG. 3.

The light controller 70 excludes the brightness of the light reflected from the display panel 30 to the illumination unit 20 from the brightness of the sensed light, thereby correcting the brightness of the sensed light according to the reflective characteristics of the display panel 30. In this embodiment, the light controller 70 receives information about the number of pixels to be turned on from the panel driver 80, and uses a predetermined function to calculate the brightness of the light reflected from the display panel 30 to the illumination unit 20 corresponding to the number of pixels to be turned on. FIG. 6 illustrates a display panel of the display apparatus of FIG. 3. As shown therein, if the display panel 30 includes mirro-pixels arranged in the form of 10*10 matrices, only hatched 60 pixels are turned on among 100 pixels and transmit the light to the projection unit 40, and the other 40 pixels are turned off and reflect the incident light in other directions than the projection unit 40. FIG. 7 is a graph of the brightness of reflected light according to the number of turned-on pixels in the display panel 30. As shown therein, the brightness of the reflected light may vary depending on the number of turned-on pixels. The brightness of the reflected light is varied according to the reflective characteristics of the display panel 30 or the optical path between the display panel 30 and the illumination unit 20. In FIG. 7, "A" shows that the brightness of the reflected light is in direct proportion to the number of turned-on pixels. In this case, the function of "A" may be a linear function (e.g., y=ax+b). On the other hand, "B" and "C" show a nonlinear optical characteristic, i.e., a curve, and the functions of "B" and "C" may be quadratic or higher-degree functions (e.g., $y=ax^n+bx^{n-1}+cx^{n-2}$ ... ). The light controller 70 calculates the brightness of the reflected light on the basis of a predetermined function incorporating the optical characteristics, and excludes the calculated brightness from the brightness of the sensed light. Through this process, it is possible to calculate the brightness of the light excluding the effects of the light reflected from the illumination unit 20 when an image is displayed.

According to another embodiment of the present invention, the light controller 70 may include a storage that stores the brightness of the reflected light corresponding to the number of turned-on pixels. In this case, a lookup table may be used as the storage. If the light controller 70 uses the lookup table, there is no need of calculating the brightness of the reflected light every time when the light is sensed, thereby reducing time taken in correcting the brightness. Further, if the storage storing the lookup table is provided not inside the display apparatus but as an external device, a required capacity of an internal memory in the display apparatus can be reduced. The lookup table may be updated in consideration of a taste of a user or a deterioration of the display panel 30.

Figure 8:
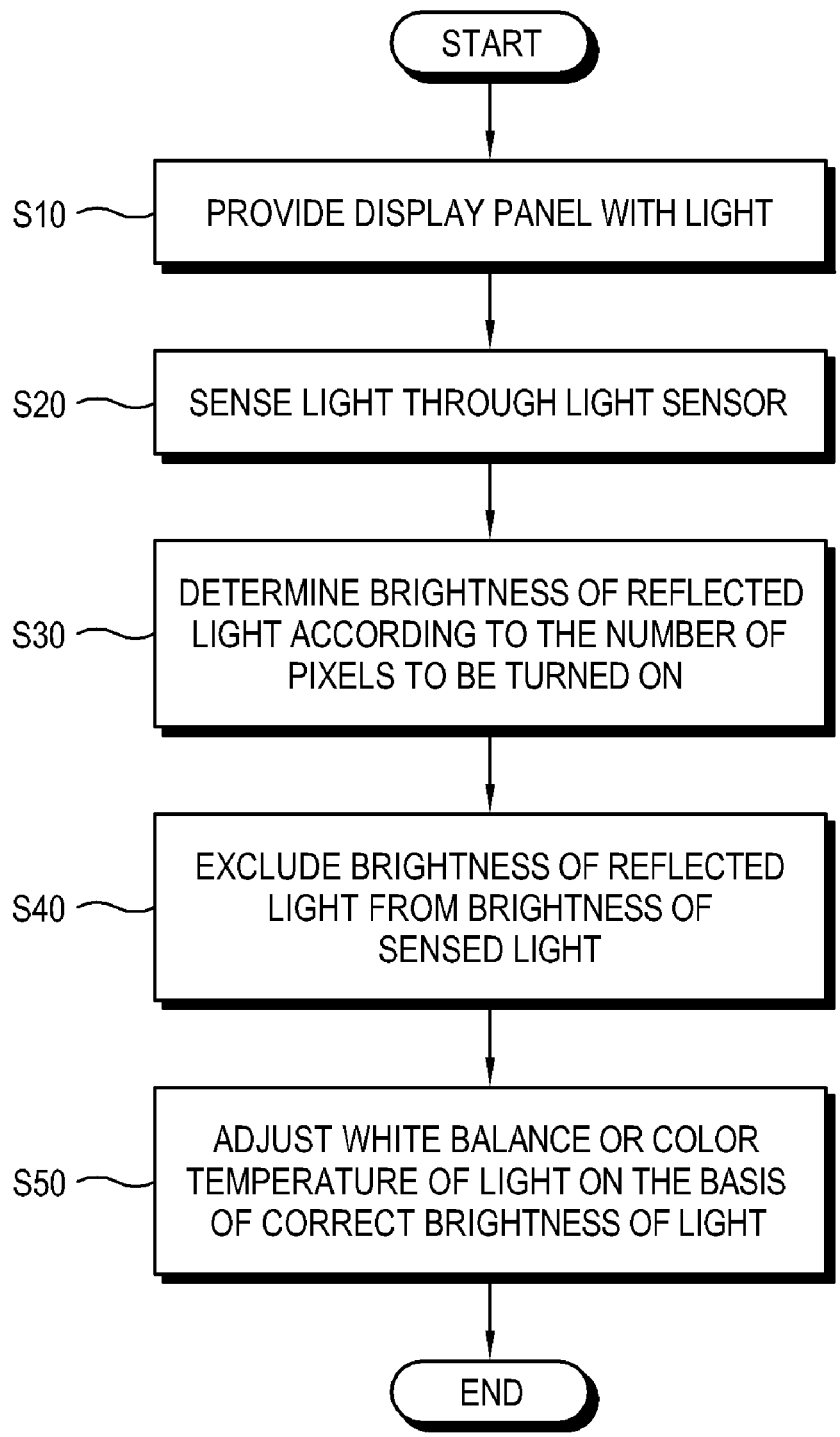
FIG. 8 is a control flowchart for explaining a light control method of the display apparatus of FIG. 3.

FIG. 8 is a control flowchart for explaining a light control method of the display apparatus of FIG. 3. Referring to FIG. 8, the light control method is as follows. First, the display panel 30 is driven by the panel driver 80, and at the same time the light source unit 10 is driven to emit the light to the display panel 30 by the light source driver 90 (S10).

If the light sensor 50 placed between the light source unit 10 and the illumination unit 20 senses the light (S20), the light controller 70 determines the brightness of the light reflected from the display panel 30 toward the illumination unit 20 on the basis of the number of turned-on pixels (S30). At this time, the controller 70 may use the lookup table that stores the information about the brightness of the reflected light, or a certain function to calculate the brightness of the reflected light. In any case, the reflective characteristics of the display panel 30 is incorporated in the brightness of the reflected light, so that the light controller 70 determines the brightness of the light in consideration of the type, the deterioration, the characteristics, etc. of the display panel 30.

Then, the light controller 70 excludes the brightness of the reflected light from the brightness of the sensed light (S40). Through these processes, the light controller 70 can get the correct brightness of the light emitted from the light source unit 10.

The light controller 70 adjusts at least one of the white balance and the color temperature of the light to be offered to the display panel 30 on the basis of the correct brightness of the light (S50). The light controller 70 may output the information about the correct brightness of the light to the light source driver 90. In this case, the light source driver 90 adjusts the driving power supplied to the light source unit 10 according to the corrected white balance or color temperature.

As described above, an aspect of the present invention provides a display apparatus and a light control method of the same, in which the quantity of light is prevented from decreasing to thereby prevent the brightness of an image from decreasing.

Another aspect of the present invention provides a display apparatus and a light control method of the same, in which the brightness of light is precisely sensed.

Another aspect of the present invention provides a display apparatus and a light control method of the same, in which the brightness of light is quickly sensed using an inexpensive operation amplifier (OP-AMP).

A aspect of the present invention provides display apparatus and a light control method of the same, in which there is no need of displaying a black image, thereby preventing a flicker.

Although the embodiments of the present invention has been explained with respect to the projection type displays, the present invention may be applied to direct view type displays, such as LCD devices, which may require sensing of the amount of the light of the light source. That is, the amount of the light reflected by the surrounding element of the sensor may be subtracted from the sensed light value in accordance with a pre-stored value in the form of a look-up table or calculated using a predetermined function that correspond to the characteristics of the surrounding elements. The characteristic of the surrounding elements may include any one or all of the following characteristics such as the number of the pixels of the display panel that are turned on, the reflective characteristics of the diffuser plates and other elements.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising a display panel, a light source unit, an illumination unit to illuminate the display panel with light emitted from the light source unit, and a projection unit to project the light from the display panel in a predetermined direction, the display apparatus comprising:
   a light sensor which is provided between the light source unit and the illumination unit; and
   a light controller which corrects brightness of light sensed by the light sensor on the basis of reflective characteristics of the display panel.

2. The display apparatus according to claim 1, wherein the light controller excludes the brightness of the light reflected from the display panel to the illumination unit from the brightness of the sensed light.

3. The display apparatus according to claim 2, wherein the display panel comprise a digital micro-mirror device (DMD) having a plurality of pixels, and
   the light controller comprises a storage that stores the brightness of the light reflected from the display panel to the illumination unit in correspondence to the number of pixels to be turned on.

4. The display apparatus according to claim 2, wherein the display panel comprise a digital micro-mirror device (DMD) having a plurality of pixels, and
   the light controller calculates the brightness of the light reflected from the display panel to the illumination unit in correspondence to the number of pixels to be turned on, through a predetermined function.

5. The display apparatus according to claim 1, wherein the light source unit comprises a plurality of light sources that emit light having different colors, and the display apparatus further comprising a light source driver to supply driving power to the light source unit to emit light having different colors in sequence according to predetermined periods.

6. The display apparatus according to claim 5, wherein the light sensor outputs a sensed voltage corresponding to the sensed light, and
   the light controller comprises an operation amplifier to which the sensed voltage and a reference voltage of which level is adjusted by a pulse width modulation (PWM) signal corresponding to the driving power are input, and determines a duty ratio of the PWM signal corresponding to the sensed voltage on the basis of an output signal from the operation amplifier.

7. The display apparatus according to claim 1, wherein the light sensor comprises a signal converter to convert the brightness of the sensed light into a digital signal.

8. The display apparatus according to claim 1, wherein the light controller adjusts at least one of a white balance and a color temperature of the light to be offered to the display panel on the basis of the correct brightness of the light.

9. A display apparatus comprising a display panel, a light source unit, an illumination unit to illuminate the display panel with light emitted from the light source unit, and a projection unit to project the light from the display panel in a predetermined direction, the display apparatus comprising:
   a light sensor which is provided between the light source unit and the illumination unit; and
   a light controller which determines brightness of light emitted from the illumination unit to the display panel on the basis of brightness of light sensed by the light sensor and the brightness of light reflected from the display panel to the illumination unit, and adjusts at least one of a white balance and a color temperature of the light emitted from the illumination unit to the display panel on the basis of the determined brightness of the light.

10. The display apparatus according to claim 9, wherein the display panel comprise a digital micro-mirror device (DMD) having a plurality of pixels, and
    the light controller comprises a lookup table that stores the brightness of the light reflected from the display panel to the illumination unit in correspondence to the number of pixels to be turned on.

11. The display apparatus according to claim 9, wherein the display panel comprise a digital micro-mirror device (DMD) having a plurality of pixels, and
    the light controller calculates the brightness of the light reflected from the display panel to the illumination unit in correspondence to the number of pixels to be turned on, through a predetermined function.

12. A method of control a display apparatus comprising a display panel, a light source unit, an illumination unit to illuminate the display panel with light emitted from the light source unit, and a projection unit to project the light from the display panel in a predetermined direction, the method comprising:
    providing the display panel with the light;
    sensing the light through the light sensor; and
    correcting the brightness of the sensed light on the basis of reflective characteristics of the display panel.

13. The method according to claim 12, wherein the correction of the brightness of the light comprises excluding the brightness of the light reflected from the display panel to the illumination unit from the brightness of the sensed light.

14. The method according to claim 12, wherein the display panel comprise a digital micro-mirror device (DMD) having a plurality of pixels, and the correction of the brightness of the light comprises calculating the brightness of the light reflected from the display panel to the illumination unit in correspondence to the number of pixels to be turned on, and subtracting the calculated brightness of the light from the brightness of the sensed light.

15. The method according to claim 12, further comprising adjusting at least one of a white balance and a color temperature of light to be offered to the display panel on the basis of the correct brightness of the light.

16. The method according to claim 12, wherein the correction of the brightness of the light comprises calculating the brightness of the light reflected from the display panel to the illumination unit in correspondence to the number of pixels to be turned on, and subtracting the calculated brightness of the reflected light from the brightness of the sensed light.

17. The method according to claim 12, wherein the correction of the brightness of the light comprises subtracting a stored brightness value of the light reflected from the display panel to the illumination unit, the stored brightness value corresponding to the number of pixels which are turned on.

18. The method according to claim 12, wherein the reflective characteristics of the display panel is a number of pixels that are turned on.

19. The method according to claim 12, wherein the reflective characteristics of the display panel is the type of the display panel.

20. The method according to claim 12, wherein the reflective characteristics of the display panel is the deterioration state of the display panel.

21. The method according to claim 12, wherein sensing of the light from the light source occurs before the light is transmitted through the illumination unit.

22. The method according to claim 12, wherein sensing of the light from the light source occurs after the light is transmitted through the illumination unit.

23. A method of control a display apparatus comprising a display panel, a light source unit, an illumination unit to illuminate the display panel with light emitted from the light source unit, and a projection unit to project the light from the display panel in a predetermined direction, the method comprising:

providing the display panel with the light;
sensing the light through the light sensor; and
correcting the brightness of the sensed light on the basis of number of the pixels of the display panel that are turned on.

24. The method according to claim 23, wherein the correcting the brightness occurs by subtracting the value corresponding to the reflected light from the display panel.

25. The method according to claim 23, further comprising the step of:

controlling the intensity of the light from the light source unit based upon the corrected brightness.

26. The method according to claim 24, wherein the display panel is a DMD.

27. The method according to claim 23, wherein the light sensor is a photo diode.

28. The method according to claim 23, wherein the light source unit is an LED device.

29. A method of control a display apparatus comprising a display panel and a light source unit in which the light emitted from the light source unit is directed at the display panel, the method comprising:

providing the display panel with the light;
sensing the light through the light sensor; and
correcting the brightness of the sensed light on the basis of number of the pixels of the display panel that are turned on.

30. The method according to claim 29, wherein the correcting the brightness occurs by subtracting the value corresponding to the reflected light from the display panel.

31. The method according to claim 23, further comprising the step of:

controlling the intensity of the light from the light source unit based upon the corrected brightness.

* * * * *